UNITED STATES PATENT OFFICE.

SILVESTER B. SCHENCK, OF NEWARK, NEW JERSEY.

FERTILIZER.

SPECIFICATION forming part of Letters Patent No. 517,486, dated April 3, 1894.

Application filed June 7, 1893. Serial No. 476,890. (No specimens.)

*To all whom it may concern:*

Be it known that I, SILVESTER B. SCHENCK, a citizen of the United States, residing at Newark, in the county of Essex and State of New Jersey, have invented certain new and useful Improvements in Fertilizers; and I do hereby declare the following to be a full, clear, and exact description of the invention, such as will enable others skilled in the art to which it appertains to make and use the same.

This invention relates to an improved fertilizer for agricultural purposes and also has reference to a new and useful process in the manufacture of a fertilizer in which the chief materials used are human excrement, mixed and treated with certain acid chemicals, and other materials to be used for the deodorization, evaporation and decomposition of the excrement, into an inodorous and valuable fertilizer. The great trouble in handling "night-soil" by any process heretofore suggested has been the large amount of moisture, averaging seventy per cent., and in many cases more than that. The peculiar merit of the process hereinafter described lies in the perfect success with which it meets this heretofore baffling difficulty.

The object of the present invention is to produce by the simple and ordinary processes of fertilizer mixing, a complete fertilizer, which, without any artificial drying whatever, is in perfect condition for application to the land.

My fertilizer, made by the process herein described is, on account of the peculiar physical characteristics of the product, in no way objectionable, and the goods produced are rich in vegetable matter and are entirely and remarkably free from any tendency to gumminess or stickiness.

On account of certain of the ingredients used, the finished product is exceedingly porous and friable, and lumps that may be formed by pressure crumble into powder at the slightest touch. On account of these properties of my fertilizer, the same is perfectly adapted to drilling, and any moisture, dries out very rapidly, owing to the porous characteristic of the product.

My compound consists of ground tobacco, preferably tobacco stems, excrement, (night soil,) skins and their products, as leather, or in their stead hair, or any matter from slaughter-houses may be used, such as intestines, blood, &c, treated with sulphuric acid, and sometimes with bone-black. This produces a fertilizer free from offensive odors and other objectionable features, while retaining all its valuable fertilizing properties, and its principal chemical ingredients being:—sulphuric acid, ammonia, obtained from the skins or their products, as leather, or from hair, when used, or from the intestines, blood and other slaughter-house matter, when used; phosphoric acid, potash and ammonia, obtained from excrement, (night soil); potash and ammonia, obtained from the tobacco; phosphoric acid, obtained from bone-black.

The ingredients employed in the production of my fertilizer may be used in the following proportions, viz:—

*Table I.*—Acid, seven hundred pounds; leather or hair, or both combined, four hundred and fifty pounds; bone-black, five hundred pounds; excrement, (night soil,) twelve hundred pounds; tobacco, two hundred pounds, producing about one and one half tons net, of fertilizer.

*Analysis of the same.*—Moisture, 33.70 per cent.; ammonia, 1.60 per cent.; phosphoric acid, (available,) 6.35 per cent.; phosphoric acid, (insoluble,) 0.25 per cent.; potash, 0.85 per cent.

*Table II.*—Acid, fifty per cent. to fifty-five per cent., two thousand pounds; intestines, bone and flesh, two thousand pounds; leather or hair, or both combined, fifteen hundred pounds; bone-black, two thousand pounds; excrement (night soil), five thousand five hundred pounds; tobacco, one thousand pounds, producing about six tons net, of fertilizer.

*Analysis of the same.*—Moisture, twelve per cent.; ammonia, 2.50 per cent. to three per cent.; phosphoric acid (available), eight per cent. to nine per cent.; potash 1.25 per cent. to 1.50 per cent.

*Table III.*—Acid, five thousand pounds; slaughter house refuse—intestines, four thousand five hundred pounds; blood, six hundred pounds; calves' and sheep's feet, one thousand pounds; leather, three thousand pounds; hair five hundred pounds; bone black, four thousand pounds; excrement, (night soil,) twelve thousand pounds; tobacco, one thousand pounds, producing about twelve tons net, of fertilizer.

*Analysis of the same.*—Moisture, twelve per cent.; ammonia, 2.50 per cent.; phosphoric acid, 10.50 per cent.; potash, one per cent.

To properly produce this new fertilizer, sulphuric acid is run into a suitable tank or tanks in which it is properly heated. When the acid has reached the boiling temperature, I add skins or their products, for instance leather scrap, and sometimes hair, to the mass and boil it preferably from four to six hours, whereby the materials added to the sulphuric acid are reduced to a thick jelly, thereby producing a thorough deodorizer and a disinfectant. Sometimes I prefer to add to this mass certain kinds of slaughter-house refuse, as intestines, blood, calves' feet or sheep's feet, &c., which are all of them, ammonia producers. After this mass has been sufficiently boiled, to make a jelly of the same, it is run in its hot condition to a mixing pan containing the excrement and bone-black. Before the jelly-like mass from the boiling tank or tanks is run into the mixer, said mass is preferably allowed to pass through a coarse screen, after which the several ingredients are thoroughly mixed, whereby all germs of disease in the excrement, or any other dangerous germs that may exist therein, are destroyed and the mass is thoroughly deodorized. When thoroughly mixed, I next add ground tobacco, preferably stems, from which I obtain potash combined with the organic acids in the tobacco. Furthermore, owing to the cellulose of the tobacco, which has a great drying effect, an absorbent is thus added which completely dries the mass, without further drying the material by artificial means. The material thus prepared is then removed from the mixer and pulverized by means of a suitable mill and finally sifted or screened, when the complete fertilizer is obtained in a merchantable condition, ready for use, free from offensive odors and other objectionable features, and one containing all the necessary plant food.

The compound resulting from the combination described herein above is an ammoniated super-phosphate which is one of the essential ingredients necessary in a plant food.

The ground tobacco or tobacco stems have the valuable property of completely drying the mass without any further process of drying, either artificially or by subjecting the mass to the drying properties of the air or sun.

Although I have given in the several tables hereinabove, proportions by weight of the several ingredients employed, still, the exact proportions herein given, of the several ingredients employed, may be varied, without departing from the scope of my present invention, and I therefore do not limit myself to the exact proportions herein-above given.

Having thus described my invention, what I claim is—

1. The fertilizer compound herein set forth, produced by the combination of skins or their products, or other like nitrogenous materials, treated with sulphuric acid, with excrement, (night soil) and ground tobacco, substantially as set forth.

2. The fertilizer compound herein set forth, produced by the combination of skins or their products, or other like nitrogenous materials, treated with sulphuric acid, with excrement, (night soil,) ground tobacco, and bone-black, substantially as set forth.

3. The herein described process of producing a fertilizer, which consists in:—first, boiling skins or their products, or other nitrogenous materials, in sulphuric acid, to produce a jelly-like mass, secondly, adding excrement (night soil,) and ground tobacco, and mixing the same, substantially as set forth.

4. The herein described process of producing a fertilizer, which consists in:—first, boiling skins or their products, or other like nitrogenous materials in sulphuric acid, to produce a jelly-like mass; secondly, adding excrement, (night soil,) bone-black, and ground tobacco, and mixing the same, substantially as set forth.

In testimony that I claim the invention set forth above I have hereunto set my hand this 29th day of May, 1893.

SILVESTER B. SCHENCK.

Witnesses:
FREDK. C. FRAENTZEL,
WM. H. CAMFIELD, Jr.